May 25, 1937. W. TAMMINGA ET AL 2,081,158

BEVERAGE DISPENSER

Original Filed June 15, 1932

INVENTOR
William Tamminga
and Ottorino Bonami
By Iris Schumacher
ATTORNEY

Patented May 25, 1937

2,081,158

UNITED STATES PATENT OFFICE 2,081,158

BEVERAGE DISPENSER

William Tamminga and Ottorino Bonami, New York, N. Y., assignors to Robert E. Corradini, New York, N. Y.

Application June 15, 1932, Serial No. 617,330
Renewed August 20, 1936

25 Claims. (Cl. 226—116)

This invention relates to liquid dispensers, and has particular reference to milk and beverage dispensers.

One object of this invention is to provide a liquid dispenser having improved means for filling a removable container with liquid.

The advantages of the invention may be particularly noted in connection with liquids which are disposed in sealed receptacles, or the like, which are not intended to be opened in order to obtain the liquid. Another advantage arises in dispensing liquids such as milk, which require agitation in order to prevent constituents thereof from separating, as by settling or by accumulating at the top of the liquid. Hence the invention includes a suction means such as an air pump which causes a flow of the liquid from the receptacle into a removable container by creating suction therein, the pump preferably expelling the air into the receptacle to cause agitation of the liquid therein.

An object of the invention, therefore, is to provide a device for accomplishing the foregoing in an improved manner.

Another object of the invention is the provision of a device of the nature set forth having improved means for breaking the suction on said removable container.

Another object of the invention is to provide a device of the character described having improved means whereby the rise of liquid in an opaque container can be observed.

Another object of the invention is to provide a device of the character described having improved means responsive to a movement of the container for controlling the operation of the pump means.

A further object of the invention is to furnish a device of the class alluded to having few and simple parts, and which is inexpensive to manufacture and assemble, durable, reliable, sanitary and efficient in use.

Other objects of the invention and advantages thereof will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
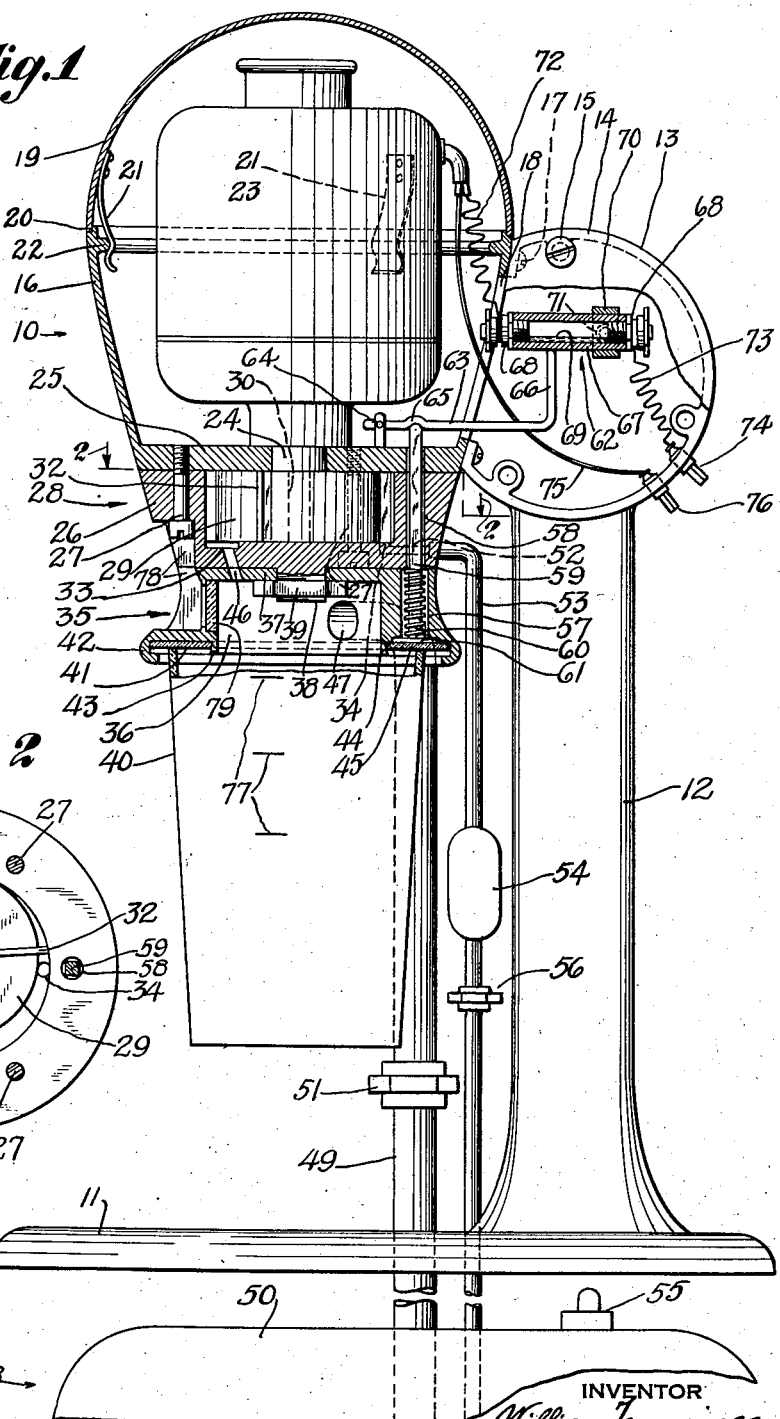
Figure 1 is a view in vertical elevation with parts in section and certain parts removed, of a device embodying the invention.
Figure 2:
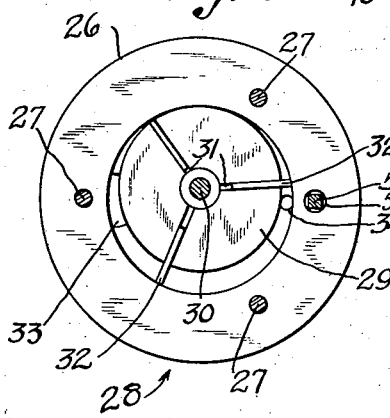
Fig. 2 is a horizontal sectional view taken on line 2—2 of Fig. 1.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

As is well known, milk is usually sold either in bottles or in large metal cans which have a capacity of a considerable number of gallons. In the latter case, the milk is dispensed by removing the cover of the can and dipping into the milk a cup having a long handle. This is an unsanitary method, and hence this invention has been devised to provide an improved and convenient sanitary means for dispensing milk which shall meet the most rigid requirements.

Generally described, this invention provides a liquid dispenser having a head, and a suction pump and liquid inlet connected thereto, the latter extending into a liquid receptacle. The pump may have its outlet connected to said receptacle as by means of a pipe extending into proximity to the bottom thereof for expelling air into the liquid to cause agitation thereof. The head may have a seat for a liquid container which removably engages the same at its rim in a substantially fluid tight manner. Thereby, the pump and liquid inlet are communicated with each other through the container to cause the liquid to flow into the latter. In order to permit the suction to be easily broken for removal of the container from its seat, any suitable means may be provided, as, for example, a movable element at said seat, which may preferably be operated by a force exerted on said container. Said element may constitute a part of a sealing gasket at the seat. In order to automatically operate the pump, the same is preferably controlled in response to movement of the element so as to cause the pump to work when the container is seated and to stop the pump when the container is removed. In the latter case, a control member may move downward with said portion of the gasket, and vent the container through a passage that is otherwise closed by the gasket.

Referring in detail to the drawing, 10 denotes a device embodying the invention. The same may include a support, such as a base 11 and a standard 12 secured thereon. Carried by the standard is a housing means, which may include a switch casing 13 fixed to the standard and having a closure plate 14 removably secured by screws 15. Said housing means may also include a casing 16 that may be fixed to casing 13 as by screws 17. The casing 16 may have a side opening 18 communicating with the casing 13, and a top cover 19 resting in a rabbet 20 and removably secured to the main casing body as by a plurality of spring clips 21 secured to the cover and detachably engageable with an annular inward projecting flange 22.

Within the casing may be suitably mounted an electrical motor 23 which may have a vertical axis of rotation and having a shaft 24 extending through a central opening in the lower wall 25 of said casing. Affixed to the bottom wall 24, is a casing 26 which may be secured by screws 27, and which, with the wall 24, may form a housing for a pump 28. The latter may be of any suitable type, and is preferably of a rotary nature. In order to act as a brake upon the motor, the pump is preferably of a positive type, which causes a frictional engagement and requires more power than a fan for its operation, and is also adapted to produce a substantially higher degree of suction, while a comparatively small volume of air need be pumped. For illustration, the pump 28 may include an eccentric rotor 29 mounted on a shaft 30 and having angularly spaced recesses 31 in which are movably seated the vanes 32 which fly out under centrifugal force to contact the circular wall of the pump casing, and cause simultaneous suction and compression at angularly spaced points 33 and 34 respectively. The rotor shaft 30 may be directly connected to motor shaft 24 if desired.

Removably connected to the pump casing 26, a member such as a head 35 may be provided. Thus said head may have a central recess 36 opening downward, and a top wall 37 having a central opening through which extends a threaded projection 38 on which is engaged a lock nut 39 for securing the members 26 and 35 together.

The member 35 may afford a continuous seat for the rim of any suitable liquid container 40. Said seat preferably faces downward so that said container may be removed without spilling any liquid collected therein. The seat may be variously formed, but, for simplicity is shown as including a yielding element such as a flat annular rubber gasket 41 which may be mounted in a suitable manner. Thus the member 35 may have a continuous outer flange 42 which may be annular and undercut to receive an edge of the gasket, and an inner circular flange 43 being provided which may be slightly undercut to receive an inner edge of the gasket. The outer flange 42 may have a greater depth than the inner flange 43 and may serve to center the container 40. A portion of the inner flange 43 may be removed at 44 to permit movement of a gasket portion 45, although the entire gasket may be somewhat loosely held by said flanges. The said movable seat portion affords a means for readily breaking the suction which is exerted by the pump on the container 40 through the passage 46 so that the flow of liquid into said container through inlet 47 is immediately stopped.

It will be noted that any suitable liquid tank or receptacle 48 may be connected to the inlet 47, as by a pipe 49, which may extend removably through a cover of said receptacle to a point adjacent to the bottom thereof. The pipe 49 may be split and the parts interconnected by a union fitting at 51 to facilitate cleaning thereof. The outlet of the pump at 34 may communicate through a passage 52 with a tube 53 which may have a suitable air filter and cleaning device at 54, and extend through cover 50 into the liquid receptacle to a point adjacent to the bottom thereof for discharging air to cause agitation of the liquid. The air may escape through a vent 55 in the cover 50. Tube 53 may be split and the parts interconnected by a union fitting 56. As these features may be clearly understood, a more detailed showing thereof is considered unnecessary.

It will now be seen that the suction connection and the liquid inlet are within the seat 41 and are above the same so that the container may be a conventional tumbler or the like.

In order to cause the pump to be automatically controlled by the container 40, a suitable control means is provided whereby, on bringing the container into proximity to the seat, the operation of the pump is caused to begin, and on removing the container, the pump ceases to operate. More generally, the control means may operate to stop the flow of liquid in any feasible manner. The control means may be located in various positions, but is preferably disposed to be actuated by a rim portion of the container, or in response to the movable element 45.

Specifically, the head 35 may have a bore 57 which communicates with a passage 58 extending through a wall of casing 26 and through wall 25. In the bore and passage is located an actuator rod 59, which may be square to afford an air clearance space or passage within the round passage and bore through which it extends. Within the bore 57, an expansion coil spring 60 may take around the rod and bear at its upper end against a shoulder afforded by casing 26 around the passage 58, and at its lower end against a plate or disc 61 which may act as a supplemental valve and is secured to the rod 59 and adapted to seat flat in a recess provided in the head 35, so that said gasket may lie in a plane for even seating of the container 40. As the latter is removed from its seat, the rod 59, by reason of its weight or with the aid of the spring, moves downward, depressing the portion 45 of the gasket and creating a vent through the cut out 44 and bore and passage 57, 58 to break the suction. The cut out 44 is confined to the region of the member 61.

The member 59 may operate a switch 62 that controls the circuit to motor 23. Thus a lever 63 may be pivotally mounted at 64 and may have a seat 65 loosely resting on the upper end of member 59 so as to be oscillated thereby. Said lever 63 may have an arm 66 arranged to contact a casing 67 which may be made of insulated material. This casing 67 may have end terminals 68 between which a quantity of mercury 69 may establish contact. To control the mercury, the casing 67 may be supported near one end on a member 70 pivotally mounted at 71 on the casing 13. Conductor wire 72 may connect the motor with one terminal of the mercury switch, and conductor wire 73 may connect the opposite switch terminal with a contact 74 fixed on casing 13. A conductor 75 may connect the motor with another contact 76 mounted on casing 13 for completing the circuit with a suitable source of current, as by a socket detachably connected to contacts 74, 76. It will be seen that the arrangement of the switch 62 and the arms of the lever 63 is such that a slight movement of the member 59 will cause the switch to open or close. The mercury switch is positive in operation and prevents objectionable arcing of the current, so that the device is adapted for long and continuous use.

The operation of the device will now be described. Upon placing a container against seat 41, the portion 45 is moved upward so that the container is in fluid tight connection with its seat. The members 59 and 63 are also moved upward, causing the switch to close and the motor 23 to operate. The pump now creates suction which serves to hold the container strongly to its seat and liquid to flow into the container while air is discharged for agitation. When the glass is filled to the desired point, it is moved slightly forward, away from standard 12, permitting a downward movement of 45, and releasing the suction under the gasket and through a communicating passage. Then as the members 59, 63 and 67 move downward, the motor and pump stop automatically. The device may be used to measure a desired quantity of liquid, as by having graduation marks 77 on transparent or glass container 40.

If the device is to be used with an opaque or substantially opaque container 40, such as a paper cup, means may be provided for observing the interior of the container so as to note the elevation of liquid therein. One possible arrangement is to provide suitable cut outs or openings 78 in members 26 and 35 at the front of the device, the adjacent bolt 27 being correspondingly elevated, and a glass window 79, or the like, being arranged in any suitable manner, as in the member 35, whereby the upper portion of the interior of the container can be observed. Preferably the window is flush with the internal surface of the recess 36 to facilitate cleaning. If the marks 77 are desired, the same may be placed on the interior of the container as by being impressed therein.

It will be appreciated that various changes and modifications may be made in the device as shown in the drawing, and that the same is submitted in an illustrative and not in a limiting sense, the scope of the invention being defined in the following claims.

We claim:

1. A liquid dispenser having a head provided with a downward facing seat for a liquid container removable from said head and having a rim engageable in air tight relation with said seat, means for causing a flow of liquid into the container including a suction pump means and a liquid supply means communicating through said head with said seat within the rim of the container, and means responsive to pressure by the container in the engaged position thereof for controlling the first mentioned means whereby liquid is caused to flow into the container by suction caused by the pump means and the flow of liquid stopped upon removing the container from the head.

2. In a liquid dispenser, for a separate liquid container, a portable pumping unit for causing a flow of liquid into said container, said pumping unit including means having a plane downward facing seating member with which the rim of the container is removably engageable in a fluid tight manner at the rim thereof, and a constantly open liquid inlet member and a suction pump individually connected with the seating member so as to communicate with said liquid container, the point of communication of the suction pump and the seating member being approximately at the level of the container rim, and the said means having means for stopping the suction on the container.

3. A liquid dispenser including a member having a downward facing seat, said seat having a gasket of a yielding material secured thereto, and a suction pump and a liquid inlet individually communicating with said seat within the gasket, whereby a liquid container is removably engageable at the rim thereof in fluid tight relation with the gasket so as to receive a flow of liquid caused by the suction produced in the container by said pump, and means at said seat actuable by a pressure of the container for controlling the operation of the pump.

4. A liquid dispenser having a member provided with a downward facing seat of yielding material for a liquid container removably seated against said seat for fluid tight engagement therewith, means including a suction pump and a liquid inlet individually downwardly communicating with the container at said seat, whereby a flow of liquid into the container from said inlet is caused by operation of said pump, and switch means for controlling said means responsive to pressure of the container at the seat.

5. A liquid dispenser including a member having a downward facing seat against which a liquid container is adapted to seat in fluid tight relation at the rim thereof, suction means and a liquid inlet element connected to said seat so as to be adapted to communicate with said liquid container, and means for causing the suction means to operate, actuated and released by said container upon positioning and removing the same, respectively, with respect to said seat.

6. A liquid dispenser including a member having a seat for removably engaging a liquid container at the rim thereof in fluid tight sealing relation with the seat, a suction pump and a liquid inlet connected to said member so as to communicate with said container, and means for causing the suction means to operate, said means being actuated and released by the container upon respective engagement and removal thereof with respect to said seat.

7. A liquid dispenser including a member having a seat for removably engaging a liquid container at the rim thereof in fluid tight sealing relation with the seat, a suction pump and a liquid inlet connected to said member so as to communicate with said container, and means for causing the suction means to operate, said means being actuated by said container.

8. A liquid dispenser including a member having a seat for removably engaging a liquid container at the rim thereof in fluid tight sealing relation with the seat, a suction pump and a liquid inlet connected to said member so as to communicate with said container, and means for causing the suction means to operate, said means being located at said seat so as to be actuated by the rim portion of said container and released upon removal of said container.

9. A liquid dispenser including a member having an annular seat of elastic material for a liquid container removably engaged at the rim thereof in fluid tight sealing relation with the seat, a suction pump and a liquid inlet connected to said member so as to communicate with said container, and said seat having a movable segmental sealing portion whereby the suction in said container can be broken, said seat being otherwise fixed to said member.

10. A liquid dispenser including a member having a seat for removably engaging a liquid container at the rim thereof in fluid tight sealing relation with the seat, a suction pump and a liquid inlet connected to said member so as to communicate with said container, said seat having a movable seat portion for breaking the suction in said container, and means for operating said suction pump controlled by said movable seat portion.

11. A liquid dispenser including a member having a bottom face, a sealing gasket positioned at said face so as to provide a downward facing seat, said gasket having a portion thereof downwardly movable relatively to said member, a control means responsive to the movement of said gasket portion, a suction means and liquid inlet connected to said member so as to communicate with said face thereof, said suction means being operated by said control means, said gasket being adapted for coaction with a liquid container removably seated against said gasket with the movable portion thereof held against said seat so as to afford a continuous fluid tight engagement with said container, whereby the latter is solely in communication with said suction means and liquid inlet, and suction in the container being broken by moving the container to cause a downward movement of said movable gasket portion.

12. A liquid dispenser including a member having a bottom face, a sealing gasket positioned at said face so as to provide a downward facing seat, said gasket having a portion thereof downwardly movable relatively to said member, a control means responsive to the movement of said gasket portion, said control means including an electrical gravity actuated mercury switch, a suction means and liquid inlet connected to said member so as to communicate with said face thereof, said suction means being operated by said control means, said gasket being arranged so that a liquid container can be removably seated against said gasket with the movable portion thereof held against said seat so as to afford a continuous fluid tight engagement with the container, whereby the latter is solely in communication with said suction means and liquid inlet, and suction in the container being broken by moving the container to cause a downward movement of said movable gasket portion.

13. A liquid dispenser including a head having a sealing element affording a downward facing seat for a liquid container, a liquid inlet and a suction pump connected to said head, the liquid container being removably seated against said element at the rim thereof, for communication with the liquid inlet and suction pump so that the latter causes liquid to flow into said container from said inlet, said element having a portion movable downward relative to said head for breaking the suction in said container upon moving the same relative to the head, and means for controlling the flow of liquid into the container responsive to a movement of said movable portion.

14. A liquid dispenser including a head having a sealing gasket affording a downward facing seat for a liquid container adapted to removably seat with the rim thereof against said gasket in substantially fluid tight relation therewith, a suction pump and a liquid inlet individually connected to said head so as to communicate with said container, means for actuating said pump, said means including a control element tending to move downwardly, said head having a passage for receiving said element with a clearance space, said element resting on a portion of said gasket with the latter closing said passage, whereby on moving the container, the said portion of the gasket is deflected downward and the container communicated with the atmosphere through said passage to break the suction in the container and the element is caused to move downward to cause the suction pump to stop.

15. A liquid dispenser including a head having a downward facing seat adapted to engage a liquid container, at the rim thereof in a fluid tight manner, a positive acting suction pump mounted on said head, and communicating with said container, a liquid inlet connected to said head to communicate with said container, means for actuating said pump, and means controlled by said container for causing said operation of the actuating means.

16. A liquid dispenser including a head having a downward facing seat, adapted to engage a liquid container, at the rim thereof in a fluid tight manner, a positive acting suction pump mounted on said head and communicating with said container, a liquid inlet connected to said head to communicate with said container, means for actuating said pump, and means controlled by said container for causing said operation of the actuating means, said controlled means being mounted on the head and being separable with the latter from the pump for cleaning.

17. A liquid dispenser including a head having a substantially circular downward facing seat for a container removably engaged at the rim thereof with said seat, means including a suction device and liquid inlet connected to said head in proximity to the central region defined by said circular seat, said seat having a movable portion, and means responsive to said movable portion for controlling the suction device.

18. A liquid dispenser including a head having an annular downward facing seat adapted to removably engage in a fluid tight manner with the rim of a liquid container, a suction pump and a liquid inlet individually connected to said head so as to communicate with the region within said annular seat for causing a flow of liquid into the container, and means actuable by the rim portion of the container whereby the suction pump is controlled.

19. A dispensing device having means including a downward facing seat for axial removable engagement with the rim of a container, a liquid inlet and a suction pump communicating with a region central of the seat for communication with the container, a motor for actuating the pump, and said means including means actuable by an axial movement of the container into engagement with its seat for controlling the motor.

20. A dispensing device including a member having a plane downward facing seat for removable engagement with the rim of a container, a liquid inlet and a suction pump for communication with the container at said seat, a motor for the pump, and means responsive to the container in the seated position thereof for controlling the motor.

21. A dispensing device including a member having a seat for removable engagement with the rim of a container, a suction pump and a liquid inlet connected to the central region of the seat for communication with the container, a motor for the pump, switch means responsive to a movement of the container into seating position for controlling the motor.

22. A dispensing device including a plane downward facing seat for removable engagement with the rim of a container by axial movement of the latter toward the seat, a liquid inlet and a suction pump communicating with the seat for communication with the container, a motor for the pump, and means responsive to said axial movement of the container for controlling the pump.

23. A liquid dispenser including a member having a substantially plane downward facing seat for removably engaging a liquid container at the rim thereof in fluid tight sealing relation with the seat, a suction pump and a liquid inlet connected to said member so as to communicate with said container, and means for causing the suction pump to operate, said means being actuated by said container.

24. A liquid dispenser having a relatively stationary head including a substantially fixed downward facing plane seat of a yielding material, said head having a suction means and a liquid inlet individually connected to communicate with the head within said seat and substantially above the plane thereof, the seat being adapted for an air tight removable seating engagement with the rim of a liquid container manually held in engagement with the seat, and means for rendering the suction means operative to the container, controlled by the container upon movement of the latter toward or away from said seat.

25. A liquid dispenser including a head having a downward facing seat for sealing engagement with a removable container, the head having a liquid inlet and a suction means for communication with the head within said seat, and the seat having a fixed portion and a portion movable by the container whereby the suction produced in the container can be broken by communication of the container with the atmosphere.

WILLIAM TAMMINGA.
OTTORINO BONAMI.